United States Patent
Tang et al.

(10) Patent No.: US 10,291,137 B2
(45) Date of Patent: May 14, 2019

(54) FLYBACK POWER CONVERTER CIRCUIT AND HIGH VOLTAGE START-UP CIRCUIT THEREOF

(71) Applicant: RICHTEK TECHNOLOGY CORPORATION, Zhubei, Hsinchu (TW)

(72) Inventors: Chien-Fu Tang, Hsinchu (TW); Isaac Y. Chen, Hsinchu (TW); Tzu-Chen Lin, Changhua (TW); Kun-Yu Lin, Hsinchu (TW); Li-Yang Hsiao, Miaoli (TW); Yung-Chih Lai, Miaoli (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/040,501

(22) Filed: Jul. 19, 2018

(65) Prior Publication Data
US 2019/0028033 A1 Jan. 24, 2019

Related U.S. Application Data

(60) Provisional application No. 62/535,879, filed on Jul. 22, 2017.

(30) Foreign Application Priority Data

Feb. 26, 2018 (CN) ............................ 2018 1 0161913

(51) Int. Cl.
*H02M 3/335* (2006.01)
*H02M 1/36* (2007.01)
*H02M 1/08* (2006.01)

(52) U.S. Cl.
CPC ......... *H02M 3/33553* (2013.01); *H02M 1/08* (2013.01); *H02M 1/36* (2013.01)

(58) Field of Classification Search
CPC ........ H02M 1/08; H02M 1/36; H02M 3/3353; H02M 3/33538; H02M 3/33546; H02M 3/33553
See application file for complete search history.

(56) References Cited

U.S. PATENT DOCUMENTS

2010/0165685 A1* 7/2010 Huang .................... H02M 1/36 363/127
2013/0193940 A1* 8/2013 Louvel .............. H02M 3/33523 323/282

(Continued)

FOREIGN PATENT DOCUMENTS

CN 106329961 A 1/2017

*Primary Examiner* — Timothy J. Dole
*Assistant Examiner* — David A. Singh
(74) *Attorney, Agent, or Firm* — Tung & Associates

(57) ABSTRACT

A flyback power converter includes a transformer having an auxiliary winding for generating an auxiliary voltage and providing a supply voltage on a supply node; a primary side controller circuit which is powered by the supply voltage from the supply node; and a high voltage (HV) start-up circuit. The HV start-up circuit is coupled to an high voltage signal through a HV input terminal and generates the supply voltage through a supply output terminal, wherein when the supply voltage does not exceed a start-up voltage threshold, a HV start-up switch conducts the HV input terminal and the supply output terminal to provide the supply voltage, and when the supply voltage exceeds a start-up voltage threshold, the HV start-up switch is OFF. The HV start-up circuit and the primary side controller circuit are packaged in two separate integrated circuit packages respectively.

14 Claims, 13 Drawing Sheets

(56) References Cited

U.S. PATENT DOCUMENTS

| | | | |
|---|---|---|---|
| 2013/0236203 A1* | 9/2013 | Nakajima | H02M 3/33507 |
| | | | 399/88 |
| 2013/0242620 A1* | 9/2013 | Hosotani | H02M 1/36 |
| | | | 363/21.09 |
| 2013/0342938 A1* | 12/2013 | Eom | H02M 1/32 |
| | | | 361/18 |
| 2014/0177290 A1* | 6/2014 | Zhang | H02M 3/33507 |
| | | | 363/21.13 |
| 2016/0336851 A1* | 11/2016 | Li | H02M 1/32 |
| 2016/0352237 A1* | 12/2016 | Quigley | H02M 3/33546 |
| 2017/0005583 A1 | 1/2017 | Choi | |

* cited by examiner

US 10,291,137 B2

FLYBACK POWER CONVERTER CIRCUIT AND HIGH VOLTAGE START-UP CIRCUIT THEREOF

CROSS REFERENCE

The present invention claims priority to US 62/535879, filed on Jul. 22, 2017, and to CN 201810161913.X, filed on Feb. 26, 2018.

BACKGROUND OF THE INVENTION

Field of Invention

The present invention relates to a flyback power converter circuit. Particularly it relates to a flyback power converter circuit with a high voltage start-up circuit. The present invention also relates to a high voltage start-up circuit for use in the flyback power converter circuit.

Description of Related Art

FIG. 1 shows a prior art flyback power converter circuit (flyback power converter circuit 1). The flyback power converter circuit 1 comprises a transformer 10, a primary side switch N1, and a primary side controller circuit 38. The auxiliary winding WA provides a supply voltage VDD to supply power to the primary side controller 38. The primary side controller 38 may be packaged in a SOT23-6 type package to reduce cost. The supply voltage VDD may be charged up through an external resistor R1 during power start-up stage. The primary side controller 38 starts operating when the supply voltage VDD achieves a certain level. However, the power start-up process requires a long time in this prior art. Besides, extra circuits are required to bleed the high voltage signal (such as the AC input voltage VAC) for safety.

FIG. 2 shows a prior art flyback power converter circuit (flyback power converter circuit 2). The flyback power converter circuit 2 further comprises a high voltage start-up switch SSU. During power start-up stage, when the supply voltage is lower than a start-up threshold, the high voltage start-up switch SSU is controlled to be ON by the primary side controller circuit 38' through the pin ASU, so that the input voltage VIN can charge up the supply capacitor CDD directly to raise the supply voltage VDD rapidly for power start-up.

The prior art circuit in FIG. 2 has a drawback that the primary side controller circuit 38' needs a dedicated pin ASU for a dedicated control function to control the high voltage start-up switch SSU. With the addition of the pin ASU, a larger type of package such as SOP8 is required, which increases the cost as well as the circuit board size. Besides, for suppliers or customers who supply or use both the primary controller circuit 38 and 38', the inventory control becomes an issue.

FIG. 3 shows another prior art flyback power converter circuit (flyback power converter circuit 3). The flyback power converter circuit 3 integrates the high voltage start-up circuit SSU into the primary side controller circuit 39. Due to the increase of the pin number (for example the pin HV shown in the figure) and the integration of the high voltage start-up switch and the control circuit, the cost and circuit board size significantly increase. The inventory control issue is also a problem to this prior art.

FIG. 4 shows another prior art flyback power converter circuit (flyback power converter circuit 500) disclosed in US 2017/0005583 A1. The flyback power converter circuit 500 controls an external high voltage start-up switch QD with a multi-function pin FB. Since the multi-function pin FB performs multiple functions with a time-sharing base, the high voltage start-up switch QD cannot be controlled with this pin freely. More specifically, the high voltage start-up switch QD can only be controlled when the primary side controller circuit is not performing the flyback power conversion. When the external load has a high capacitance, power start-up often fails.

Besides, the high voltage start-up switch in the aforementioned prior art circuits may be provided by various different vendors, which may lead to incompatibility issues when operating with the primary side controller circuit.

Compared to the prior art in FIG. 1, the present invention is advantageous in rapid power start-up and better integration of safety functions such as high voltage signal bleeding. Compared to the prior art circuits in FIGS. 2 and 3, the present invention is advantageous in that the primary side controller circuit does not require extra control pin and control circuit for controlling the high voltage start-up switch, whereby the cost can be reduced and the inventory control is simpler. Compared to the prior art circuit in FIG. 4, the present invention is advantageous in higher flexibility in controlling the high voltage start-up switch.

Another relevant prior patent is CN 106329961A, which solves the issue by a different approach from the present invention.

SUMMARY OF THE INVENTION

From one perspective, the present invention provides a flyback power converter circuit, comprising: a transformer, which includes a primary side winding for receiving an input voltage; a secondary side winding for generating an output voltage; and an auxiliary winding for generating an auxiliary voltage and providing a supply voltage on a supply node; a primary side switch, coupled to the primary side winding and configured to control the primary side winding; a primary side controller circuit, which is located at a primary side of the transformer and powered by the supply voltage through the supply node, and is configured to operably generate a primary side switch control signal to control the primary side switch; and a high voltage (HV) start-up circuit, including a high voltage (HV) input pin and a supply output pin, wherein the HV input pin is coupled to a high voltage (HV) signal, and the HV start-up circuit provides the supply voltage on the supply node through the supply output pin; wherein the HV start-up circuit further includes: a high voltage (HV) start-up switch, wherein a current inflow terminal of the HV start-up switch is coupled to the HV input pin, and a current outflow terminal of the HV start-up switch is coupled to the supply output pin; a switch control circuit, configured to operably control the HV start-up switch according to a sensing output signal; and a signal sensing circuit, configured to operably generate the sensing output signal to control the HV start-up switch by one of the following ways: (1) the signal sensing circuit being configured to sense the supply voltage, wherein when the supply voltage does not exceed a start-up voltage threshold, the switch control circuit controls the HV start-up switch to be ON to conduct the HV signal for providing the supply voltage on the supply node, and when the supply voltage exceeds the start-up voltage threshold, the HV control circuit controls the HV start-up switch to be OFF; (2) the signal sensing circuit being configured to sense a primary side related signal to determine whether the primary side controller circuit is performing a PWM switching operation, wherein when the primary side controller circuit is not performing the PWM switching operation, the switch control circuit controls the HV start-up switch to be ON to conduct the HV signal for providing the supply voltage on the supply node, and when the primary side controller circuit is performing the PWM switching operation, the switch control circuit controls the HV start-up switch to be OFF; wherein the primary side related signal relates to the primary side switch control signal, a primary side current related signal which relates to a primary side current that flows through the primary side winding, an auxiliary voltage related signal which relates to a voltage of the auxiliary winding, or a feedback compensation signal; wherein the HV start-up circuit and the primary side controller circuit are separately packaged into a first integrated circuit and a second integrated circuit respectively.

In one embodiment, the HV start-up circuit further includes a timing control circuit which is configured to operably perform one of the following operations: (1) determining whether the primary side controller circuit operates in a latch mode or in a hiccup mode according to a change rate of the supply voltage VDD versus time; or (2) controlling the HV start-up switch to conduct for a predetermined time period.

In one embodiment, the HV start-up circuit further includes a current sensing circuit which is configured to operably sense a conduction current of the HV start-up switch, wherein the switch control circuit determines whether the primary side controller circuit operates in a latch mode or in a hiccup mode according to the conduction current of the HV start-up switch.

In one embodiment, the HV start-up circuit further includes a HV protection circuit which is configured to operably sense the HV signal, wherein when the HV signal keeps in a non-sinusoidal form for over a predetermined time period, the HV protection circuit bleeds the HV signal.

In one embodiment, the HV signal is electrically connected to the input voltage directly.

In one embodiment, the flyback power converter circuit further comprises a rectifier circuit which is configured to operably rectify an AC input signal to generate a rectified output signal, wherein the HV signal is electrically connected to the rectified output signal.

In one embodiment, the HV start-up circuit further includes a sensing pin which is configured to operably sense the primary side related signal.

From another perspective, the present invention provides a HV start-up circuit for use in a flyback power converter circuit, the flyback power converter circuit including: a transformer, which includes a primary side winding for receiving an input voltage; a secondary side winding for generating an output voltage; and an auxiliary winding for generating an auxiliary voltage and providing a supply voltage on a supply node; a primary side switch, coupled to and configured to control the primary side winding; and a primary side controller circuit, which is located at a primary side of the transformer and powered by the supply voltage through the supply node, and is configured to operably generate a primary side switch control signal to control the primary side switch; the HV start-up circuit comprising: a high voltage (HV) input pin which is coupled to a high voltage (HV) signal; a supply output pin, wherein the HV start-up circuit provides the supply voltage on the supply node through the supply output pin; a high voltage (HV) start-up switch, wherein a current inflow terminal of the HV start-up switch is coupled to the HV input pin, and a current outflow terminal of the HV start-up switch is coupled to the supply output pin; a switch control circuit, configured to operably control the HV start-up switch according to a sensing output signal; and a signal sensing circuit, configured to operably generate the sensing output signal to control the HV start-up switch by one of the following ways : (1) the signal sensing circuit being configured to sense the supply voltage, wherein when the supply voltage does not exceed a start-up voltage threshold, the switch control circuit controls the HV start-up switch to be ON to conduct the HV signal for providing the supply voltage on the supply node, and when the supply voltage exceeds the start-up voltage threshold, the HV control circuit controls the HV start-up switch to be OFF; (2) the signal sensing circuit being configured to sense a primary side related signal to determine whether the primary side controller circuit is performing a PWM switching operation, wherein when the primary side controller circuit is not performing the PWM switching operation, the switch control circuit controls the HV start-up switch to be ON to conduct the HV signal for providing the supply voltage on the supply node, and when the primary side controller circuit is performing the PWM switching operation, the switch control circuit controls the HV start-up switch to be OFF; wherein the primary side related signal relates to the primary side switch control signal, a primary side current related signal which relates to a primary side current that flows through the primary side winding, an auxiliary voltage related signal which relates to a voltage of the auxiliary winding, or a feedback compensation signal; wherein the HV start-up circuit and the primary side controller circuit are separately packaged in a first integrated circuit and a second integrated circuit respectively.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
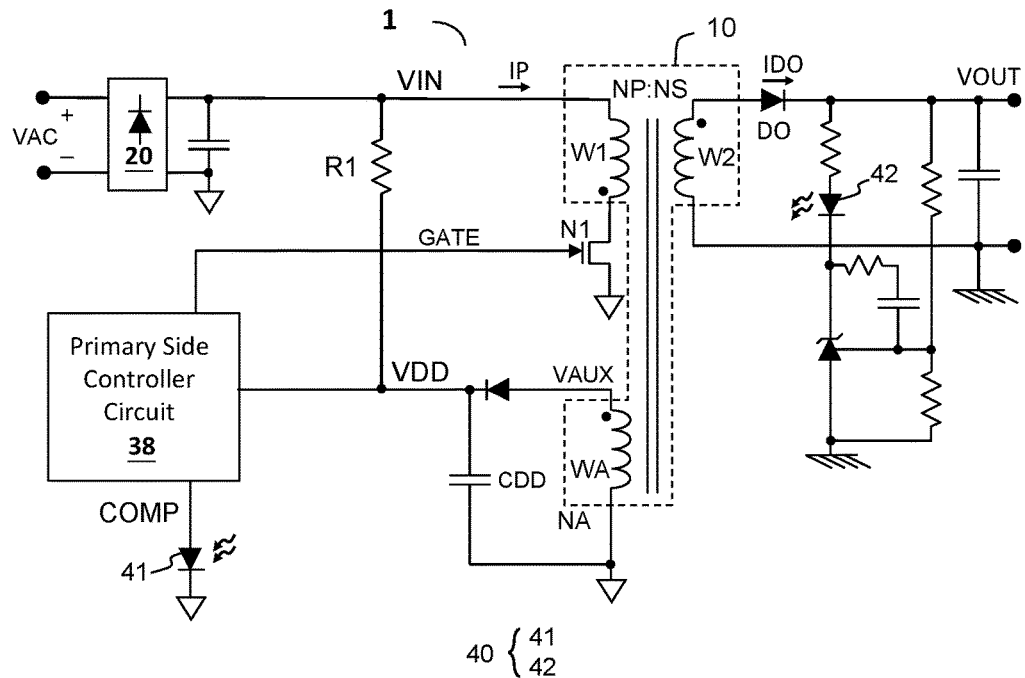
FIG. 1 shows a schematic diagram of a prior art flyback power converter circuit which does not include rapid power start-up function.
Figure 2:
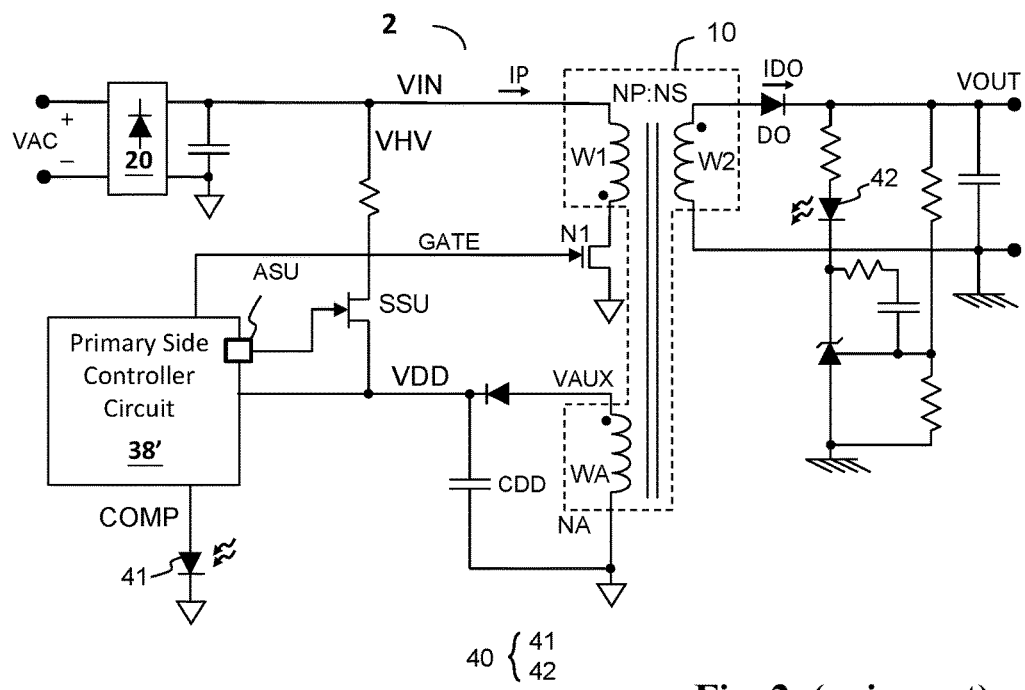
FIG. 2 shows a schematic diagram of a prior art flyback power converter circuit which does not include rapid power start-up function.
Figure 3:
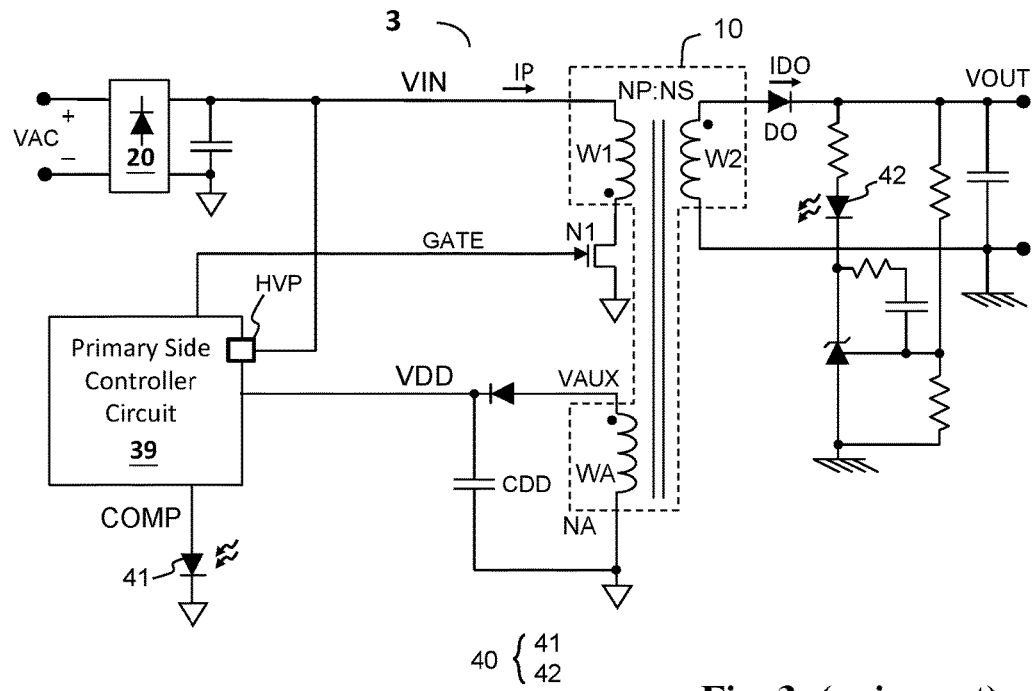
FIG. 3 shows a schematic diagram of a prior art flyback power converter circuit which integrates therein a high voltage start-up switch for performing a rapid power start-up function.
Figure 4:
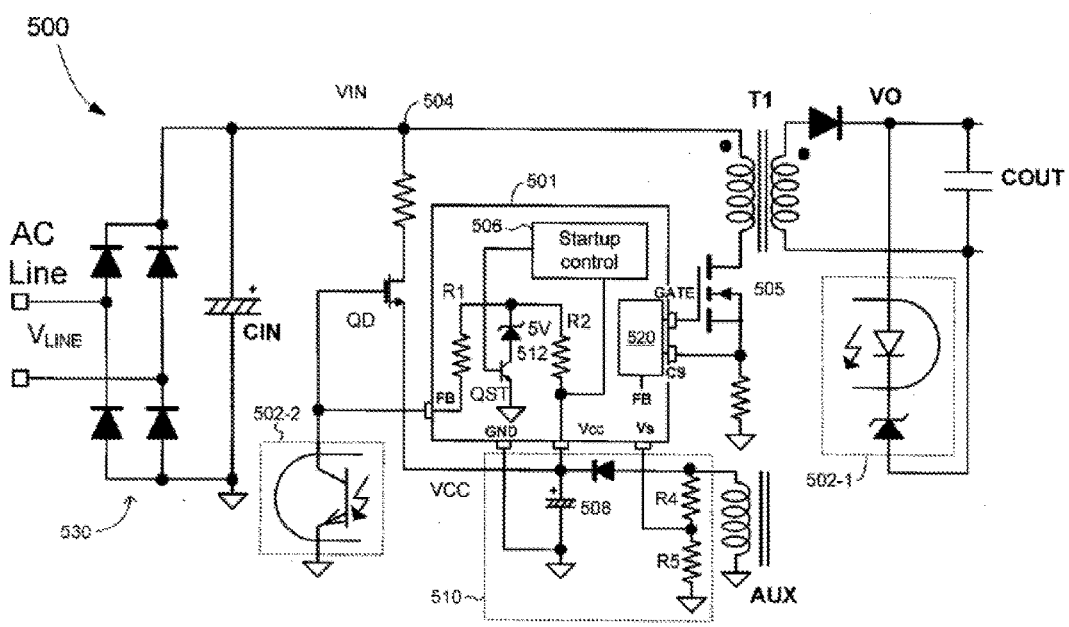
FIG. 4 shows a schematic diagram of a prior art flyback power converter circuit which controls a high voltage start-up switch through a multi-function pin for performing a rapid power start-up function.
Figure 5A:
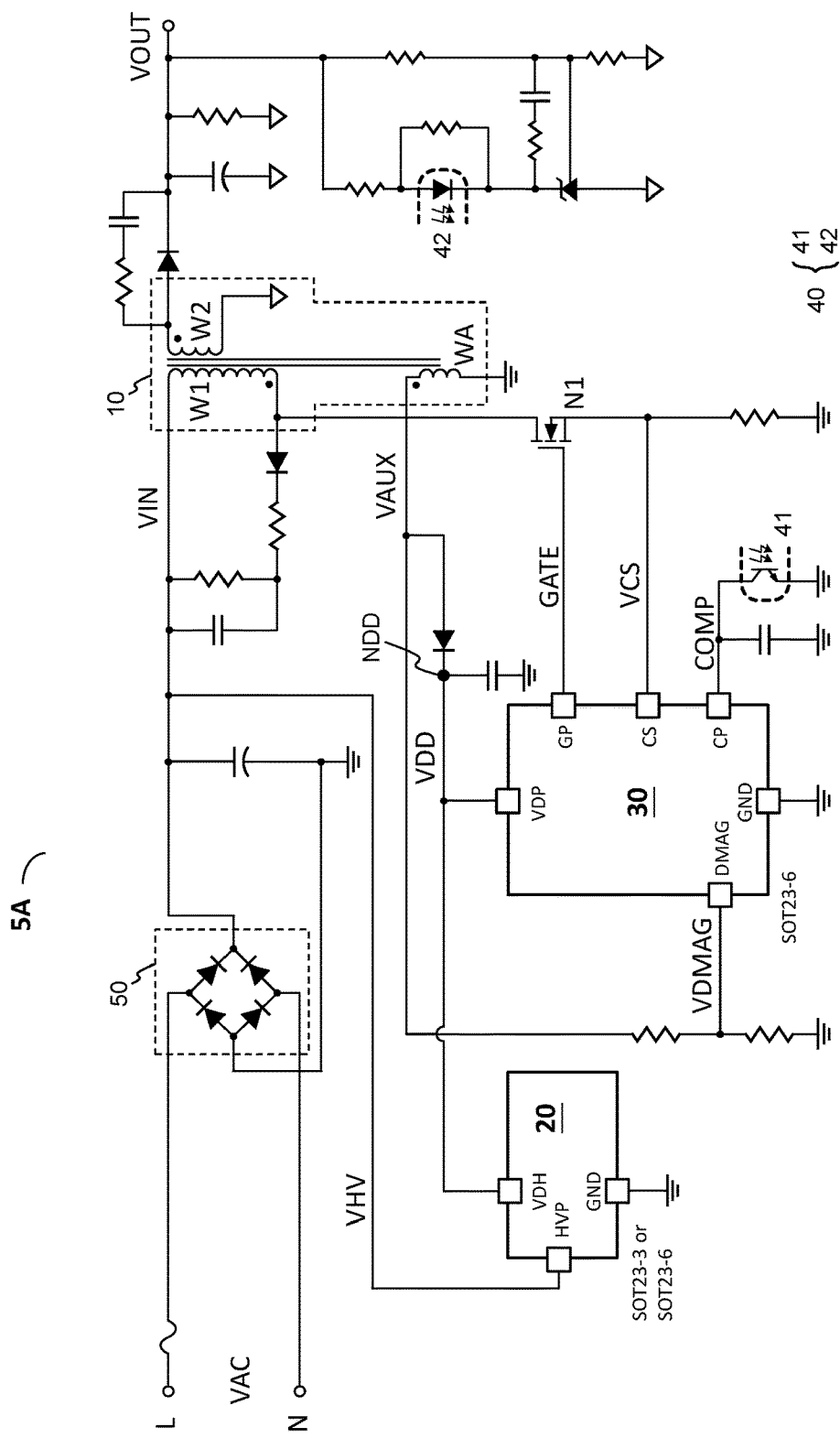
FIGS. 5A-5B show schematic diagrams of embodiments of the flyback power converter circuit according to the present invention.

FIG. 5A shows one embodiment of the flyback power converter circuit according to the present invention (flyback power converter circuit 5A). The flyback power converter circuit 5A comprises a transformer 10, a primary side switch N1, and a primary side controller circuit 30. The transformer 10 includes a primary side winding W1, a secondary side winding W2, and an auxiliary winding WA. The primary side winding W1 receives an input voltage VIN. The secondary side winding W2 generates an output voltage VOUT. In one embodiment, a rectifier circuit 50 rectifies an AC input signal VAC to generate the input voltage VIN. The auxiliary winding WA generates an auxiliary voltage VAUX and provides a supply voltage VDD on the supply node NDD, wherein the supply voltage VDD relates to the auxiliary voltage VAUX. In one embodiment, the supply voltage VDD is the auxiliary voltage VAUX itself, or is obtained by, for example but not limited to, rectifying, filtering or regulating the auxiliary voltage VAUX. The primary side switch N1 is coupled to the primary side winding W1. The primary side controller circuit 30 is located at a primary side of the transformer 10 and powered by the supply voltage VDD from the supply node NDD. The primary side controller circuit 30 is configured to operably generate a primary side switch control signal GATE, for controlling the primary side switch N1 which controls the primary side winding W1. In one embodiment, the primary side controller circuit 30 may generate the primary side switch control signal GATE in PWM (pulse width modulation) form according to the feedback compensation signal COMP, to control the primary side switch N1. In one embodiment, the flyback converter circuit 2A may obtain secondary side information through a coupling device 40 for feedback control. In another embodiment, the flyback power converter circuit 5A may perform feedback control according to feedback information provided from the primary side, for example an auxiliary sensing signal VDMAG. In this case, the coupling device 40 may be omitted. Note that in one embodiment, a signal related to the output voltage VOUT (information related to the output voltage VOUT) can be obtained through the auxiliary sensing signal VDMAG. In one embodiment, a signal related to the input voltage VIN (information related to the input voltage VIN) can be obtained through the auxiliary sensing signal VDMAG. In one embodiment, the primary side controller circuit 30 may further sense a primary side current related signal VCS (through for example the CS pin as shown in the figure) to control the primary side switch N1, wherein the primary side current related signal relates to for example but not limited to a primary side winding current, a primary side switch current through the primary side switch N1, or a secondary side winding current.

Still referring to FIG. 5A, in one embodiment, a HV start-up circuit 20 is provided, and a high voltage (HV) input pin HVP of the HV start-up circuit 20 is coupled to a high voltage (HV) signal VHV. The HV start-up circuit 20 provides the supply voltage VDD on the supply node NDD through a supply output pin VDH of the HV start-up circuit 20.

In this embodiment, the HV start-up circuit 20 and the primary side controller circuit 30 are separately packaged in a first integrated circuit and a second integrated circuit respectively. In one embodiment, the HV start-up circuit 20 can be packaged in an SOT23-3 or SOT23-6 type integrated circuit package. In one embodiment, the primary side controller circuit 30 can be packaged in an SOT23-6 type integrated circuit package.

Figure 5B:
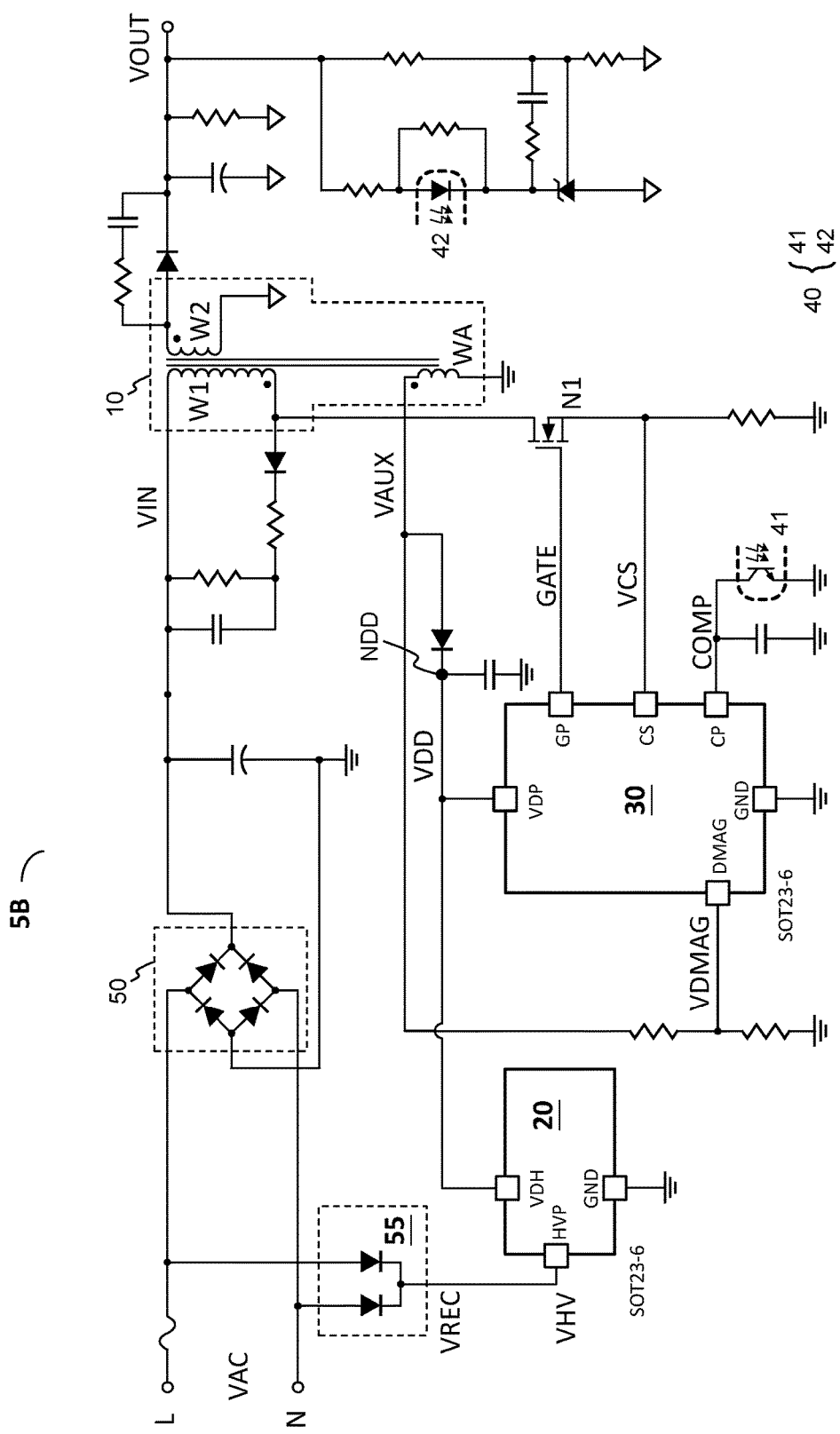

Still referring to FIG. 5A, in one embodiment, the HV signal VHV is electrically connected to the input voltage VIN directly. FIG. 5B shows another embodiment of the flyback power converter circuit according to the present invention (flyback power converter circuit 5B). The embodiment shown in FIG. 5B is similar to FIG. 5A but differs in that the flyback power converter circuit 5B further comprises a rectifier circuit 55 which is configured to operably rectify an AC input signal VAC to generate a rectified output signal VREC. In this embodiment, the HV signal VHV is electrically connected to the output terminal of the rectifier circuit 55 (i.e. the rectified output signal VREC). In one embodiment, the output terminal of the rectifier circuit 55 is not coupled to an output filter capacitor such that the high voltage signal VHV can include clearer AC ripple information which can be used to determine whether the AC input signal VAC is removed.

Figure 6A:
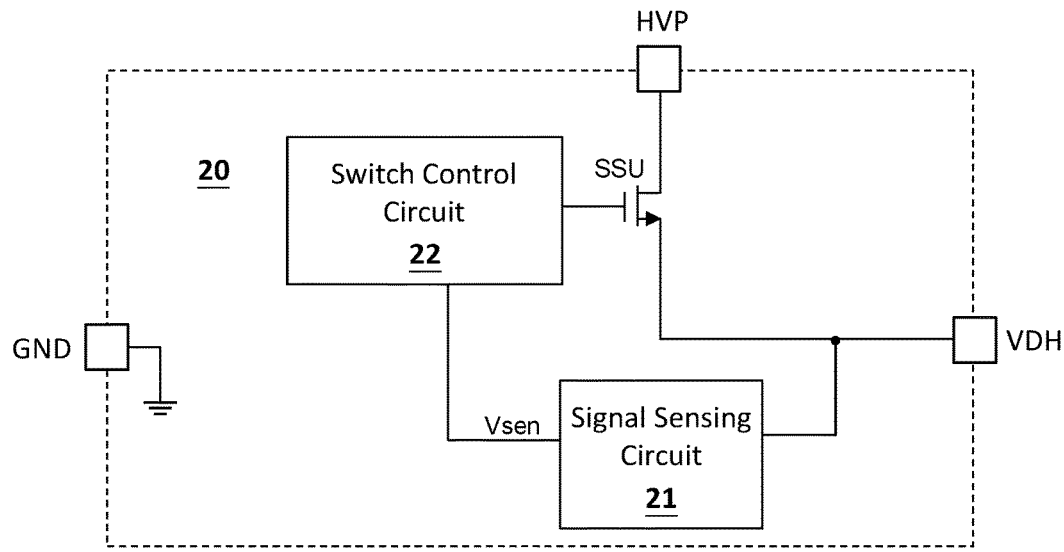
FIGS. 6A-6B show schematic diagrams of embodiments of high voltage start-up circuits of the flyback power converter circuit according to the present invention.

FIG. 6A shows a schematic diagram of one embodiment of a high voltage start-up circuit (high voltage start-up circuit 20) of the flyback power converter circuit according to the present invention. The HV start-up circuit 20 includes a high voltage (HV) start-up switch SSU, a signal sensing circuit 21, and a switch control circuit 22. A current inflow terminal of the HV start-up switch SSU is coupled to the HV input pin HVP, and a current outflow terminal of the HV start-up switch SSU is coupled to the supply output pin VDH. In this embodiment, the signal sensing circuit 21 is coupled to the supply output pin VDH and is configured to operably sense the supply voltage VDD. The switch control circuit 22 is configured to operably receive a sensing output signal Vsen of the signal sensing circuit 21. When the supply voltage VDD does not exceed a start-up voltage threshold VTH, the switch control circuit 22 controls the HV start-up switch SSU to be ON to conduct the HV signal VHV, so as to provide the supply voltage VDD on the supply node NDD, and when the supply voltage VDD exceeds the start-up voltage threshold VTH, the switch control circuit 22 controls the HV start-up switch SSU to be OFF.

Figure 6B:
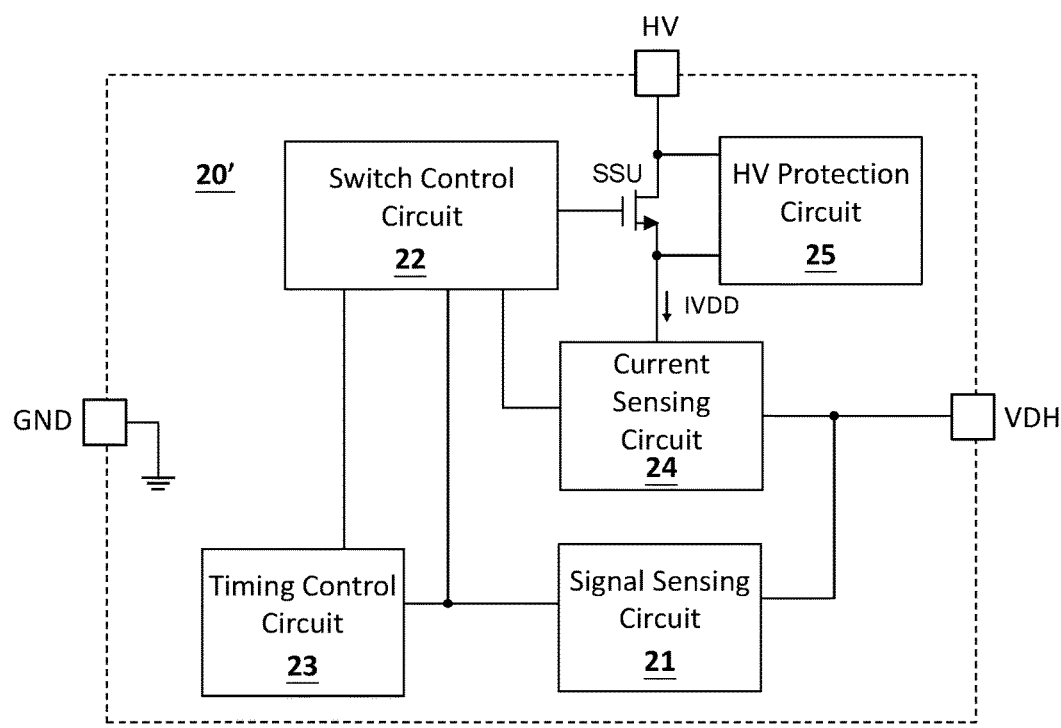

FIG. 6B shows a schematic diagram of another embodiment of a high voltage start-up circuit (high voltage start-up circuit 20') of the flyback power converter circuit according to the present invention. The high voltage start-up circuit 20' is similar to the high voltage start-up circuit 20 shown in FIG. 6A, but differs in that: in this embodiment, the HV start-up circuit 20' further includes a timing control circuit 23 which is configured to operably perform one of the following operations: (1) determining whether the primary side controller circuit 30 operates in a latch mode or in a hiccup mode according to a change rate of the supply voltage VDD versus time; or (2) controlling the HV start-up switch SSU to conduct for a predetermined time period TP.

The latch mode refers to a condition that: the primary side controller circuit 30 may stop power conversion operation when a protection state is triggered due to certain reasons (such as overly high current or overly high voltage); in this case, the primary side controller circuit 30 can only be re-started by removing the input voltage VIN (for example but not limited to, by removing the AC input signal VAC) for a period of time and re-applying the input voltage VIN. On the other hand, the hiccup mode refers to a condition that the primary side controller circuit 30 stops power conversion operation when a protection state is triggered, but it will re-start by itself after a predetermined time period.

Still referring to FIG. 6B, in one embodiment, the HV start-up circuit 20' further includes a current sensing circuit 24 which is configured to operably sense a conduction current IVDD of the HV start-up switch SSU. In this embodiment, the switch control circuit 22 determines whether the primary side controller circuit 30 operates in a latch mode or in a hiccup mode according to the conduction current IVDD of the HV start-up switch SSU.

Figure 6C:
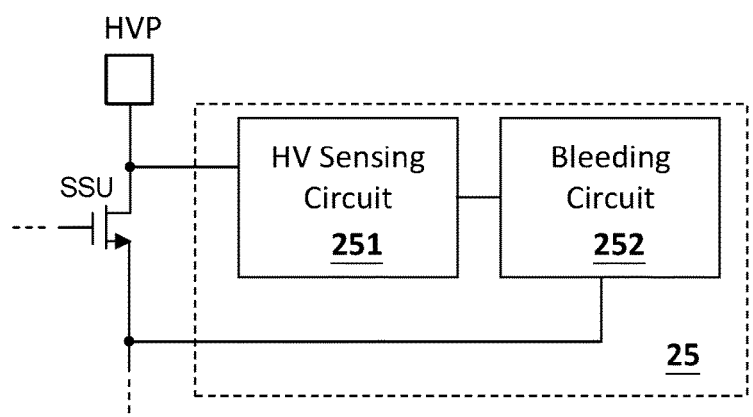
FIG. 6C shows a schematic diagram of one embodiment of a high voltage protection circuit of the flyback power converter circuit according to the present invention.

Still referring to FIG. 6B, in one embodiment, the HV start-up circuit 20' further includes a HV protection circuit 25 which is configured to operably sense the HV signal VHV, wherein when the HV signal VHV keeps in a non-sinusoidal form for over a predetermined time period, the HV protection circuit bleeds the HV signal VHV. Note that the term "bleed" indicates that the HV protection circuit 25 is configured to build up a current path to discharge or to pull down the HV signal VHV. In one embodiment, as shown in FIG. 6C, the HV protection circuit 25 includes a HV sensing circuit 251 and a bleeding circuit 252 which are configured to operably sense and bleed the HV signal VHV respectively.

Figure 7A:
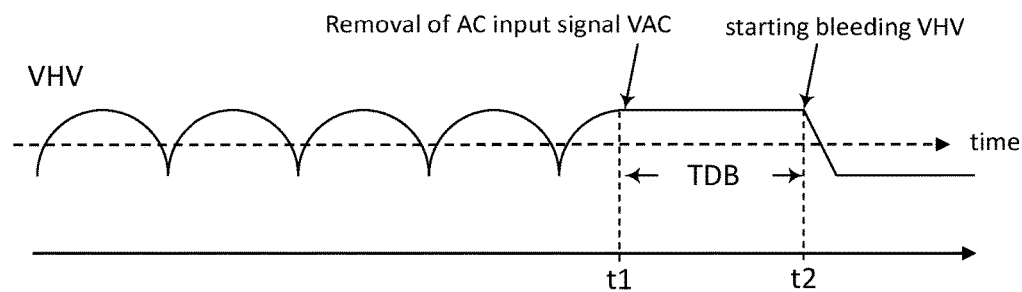
FIGS. 7A-7B show schematic waveforms corresponding to the high voltage protection circuit of the flyback power converter circuit according to the present invention.
Figure 7B:
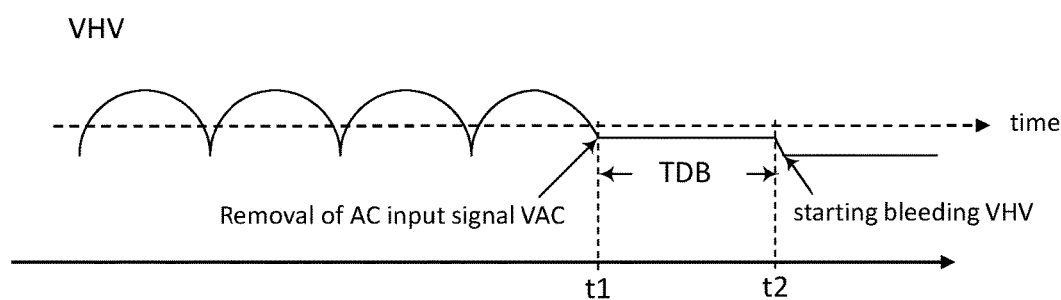

FIGS. 7A-7B show schematic waveforms corresponding to the high voltage protection circuit of the flyback power converter circuit according to the present invention. When the HV sensing circuit 251 determines that the HV signal VHV keeps in a non-sinusoidal form for over a predetermined time period, the bleeding circuit 252 bleeds the HV signal VHV to a level (such as ground level) for safety. For example, as shown in FIG. 7A, the AC input signal VAC is removed at time t1, so the HV signal VHV (for example the waveform after rectification by the rectifier circuit 55) is no more in the sinusoidal form from time point t1 and is kept at its DC level by the capacitor. After the HV signal VHV is determined not to be in sinusoidal form for a de-bouncing time period TDB, the input voltage VIN is bled to for example the ground level for safety. FIG. 7B shows a waveform similar to FIG. 7A. In FIG. 7B, the phase of the AC input voltage VAC (the time point when the AC input signal VAC is removed) is different so the level of the HV signal VHV after the removal of the AC input signal VAC is also different. Note that the term "sinusoidal form" is used in a broad sense, which can be referring to a complete sinusoidal form (such as a sine wave) or a half-wave or full-wave rectified sine wave (such as the waveforms shown in FIGS. 7A-7B).

Figure 8A:
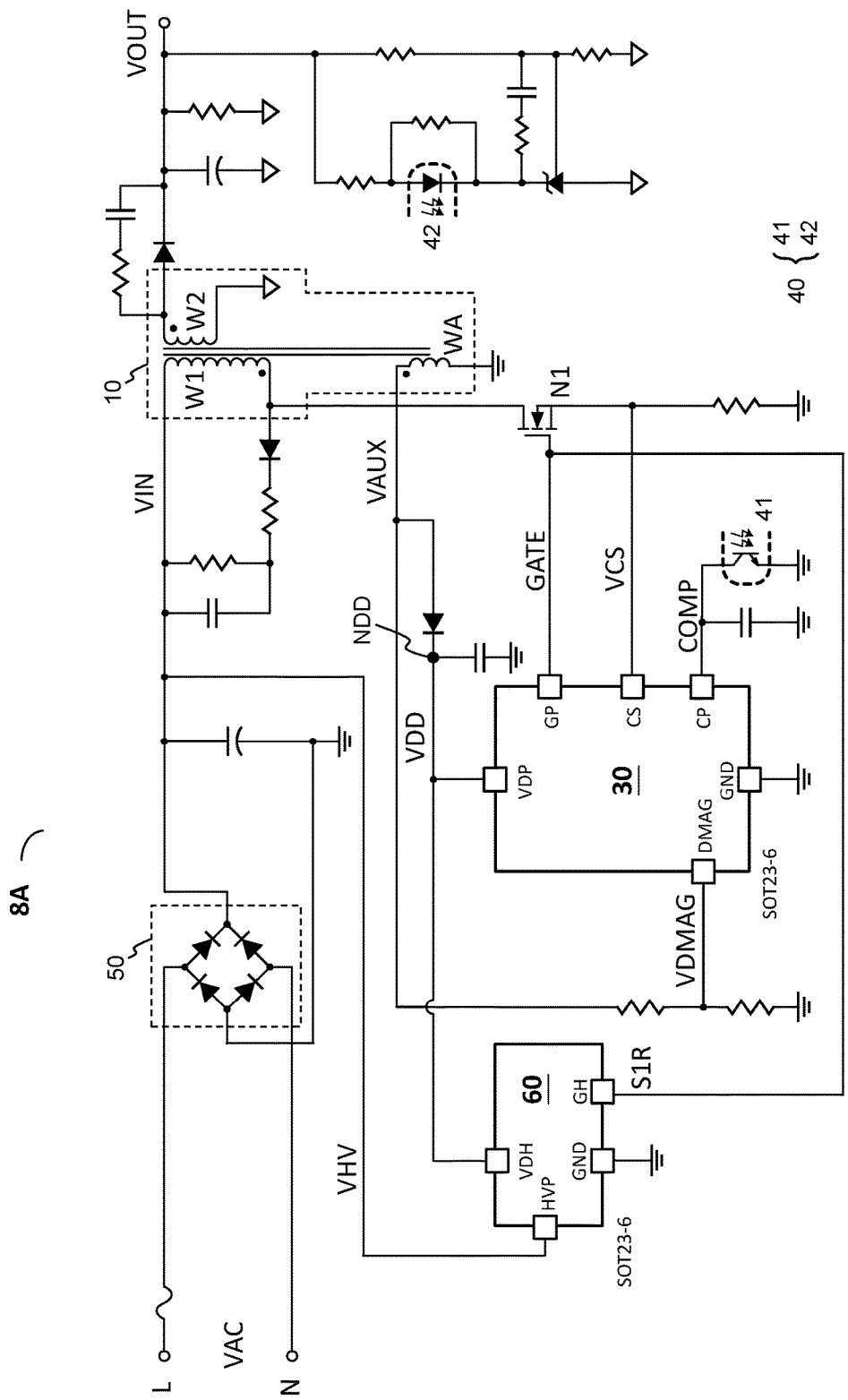
FIGS. 8A-8D show schematic diagrams of embodiments of the flyback power converter circuit according to the present invention.
Figure 8B:
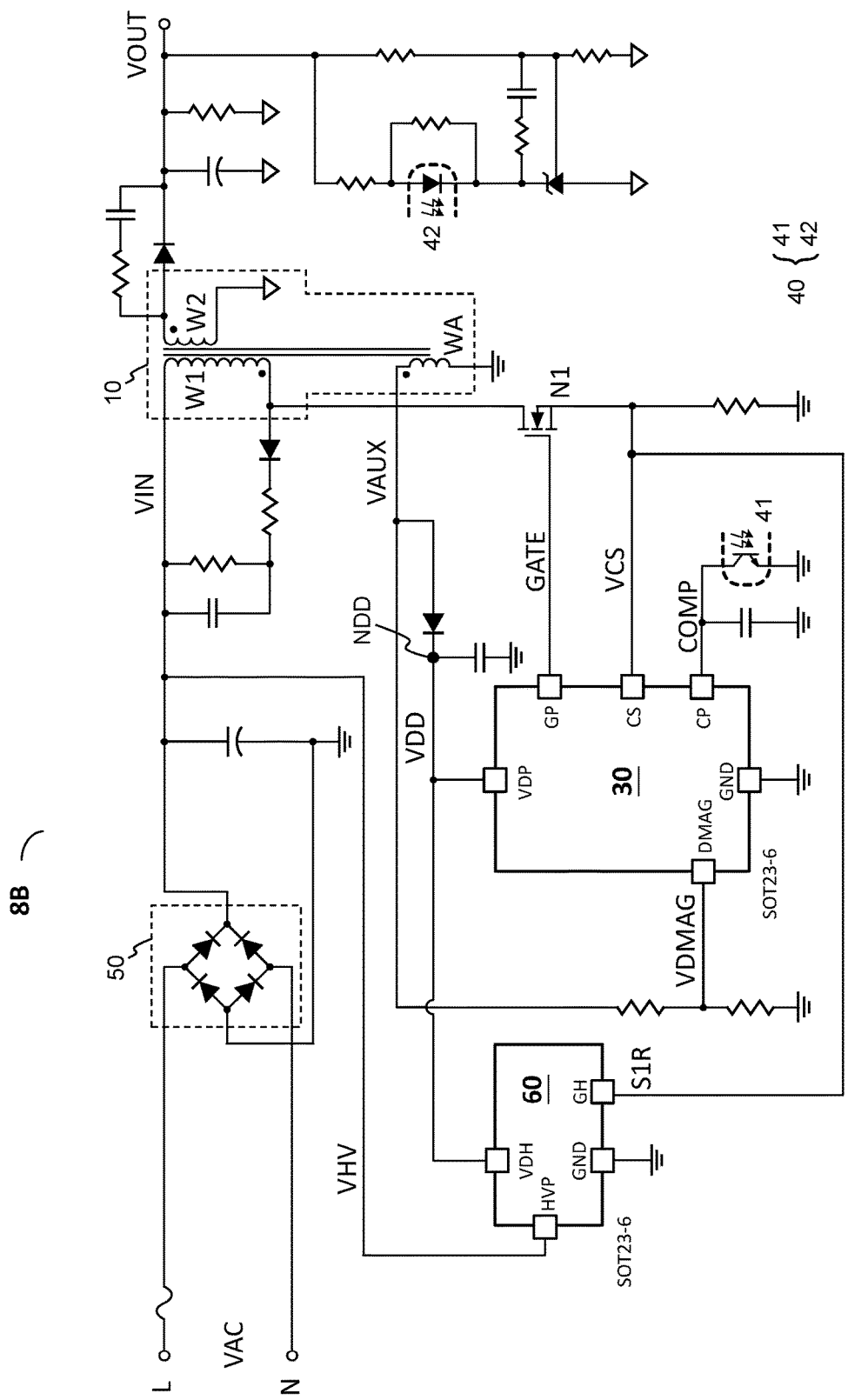
Figure 8C:
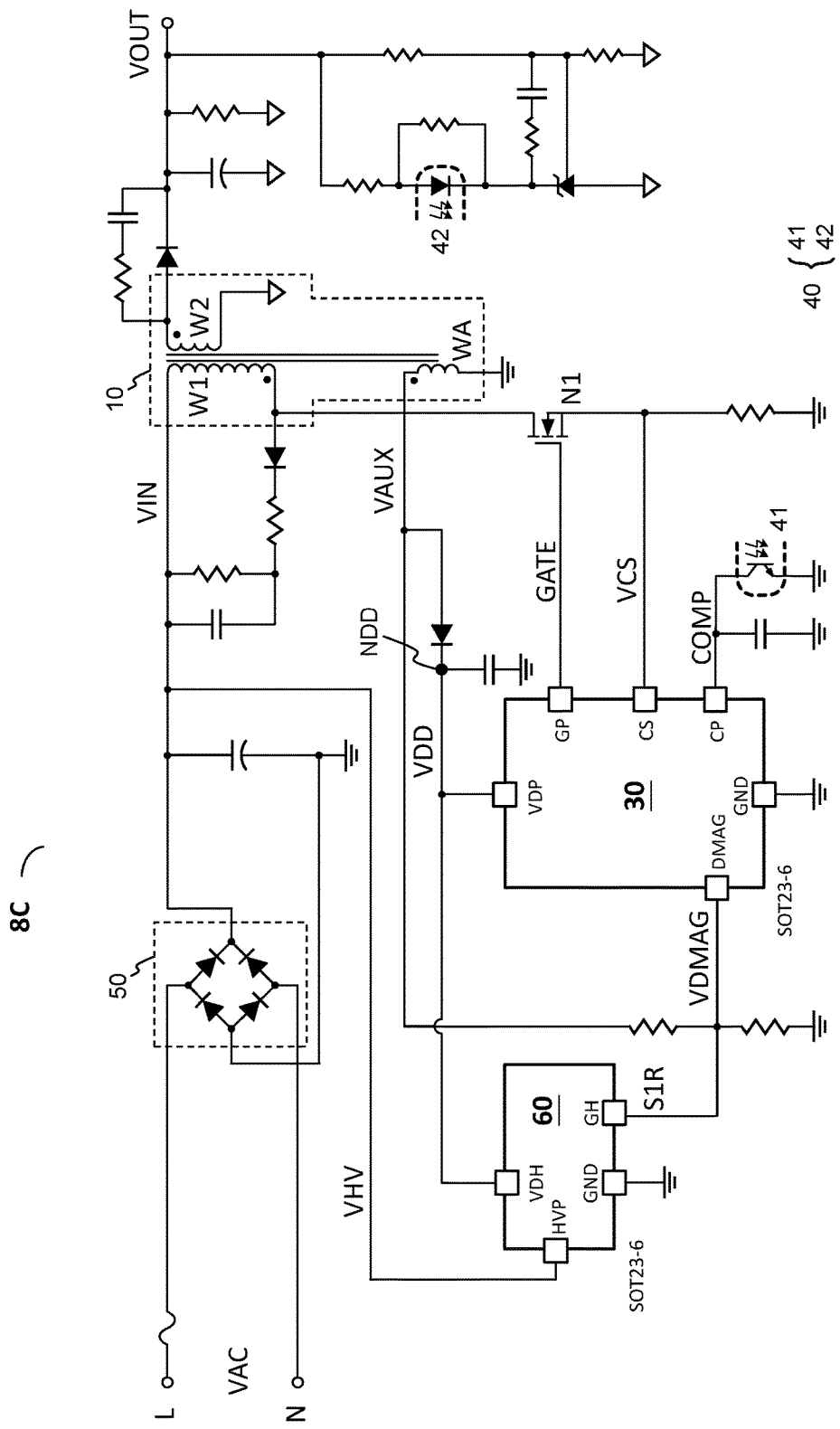

FIG. 8A shows another embodiment of the flyback power converter circuit according to the present invention (flyback power converter circuit 8A). The embodiment shown in FIG. 8A is similar to FIG. 5A but differs in that, in the flyback power converter circuit 8A, the HV start-up circuit 60 includes a sensing pin GH which is configured to operably sense the primary side related signal S1R and the HV start-up circuit 60 controls the HV start-up switch SSU according to the primary side related signal S1R. The primary side related signal S1R relates to the primary side switch control signal GATE. In one embodiment, the primary side related signal S1R can be electrically connected to the primary side switch control signal GATE directly.

Figure 9A:
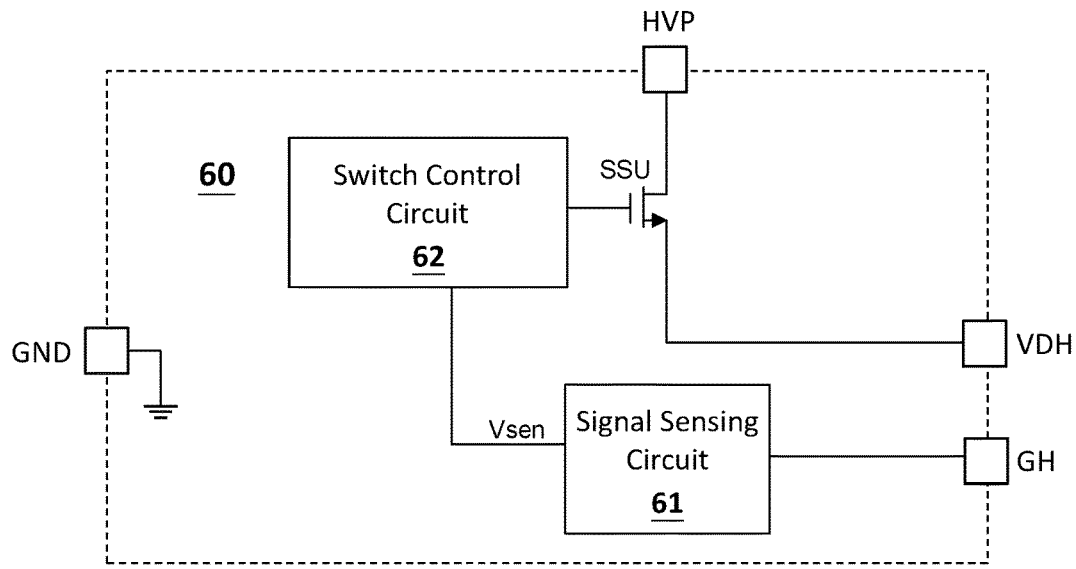
FIG. 9A shows a schematic diagram of one specific embodiment of a high voltage start-up circuit of the flyback power converter circuit according to the present invention.

FIG. 9A shows a schematic diagram of one specific embodiment of the high voltage start-up circuit of the flyback power converter circuit according to the present invention (HV start-up circuit 60). The HV start-up circuit 60 is similar to the HV start-up circuit 20, but differs in that, in this embodiment, the signal sensing circuit 61 is configured to operably sense the primary side related signal S1R through the sensing pin GH, wherein the primary side related signal S1R can be for example but not limited to the primary side switch control signal GATE. The switch control circuit 62 receives the sensing output signal Vsen of the signal sensing circuit 61 to control the HV start-up switch SSU. More specifically, in this embodiment, the signal sensing circuit 61 is configured to operably sense the primary side related signal S1R to determine whether the primary side controller circuit 30 is performing a PWM switching operation, in other words, whether the primary side related signal S1R is in a PWM form. When the primary side controller circuit 30 is not performing the PWM switching operation, which is determined by the signal sensing circuit 61 according to the primary side related signal S1R, the switch control circuit 62 controls the HV start-up switch SSU to be ON to conduct the HV signal VHV for providing the supply voltage VDD on the supply node NDD, and when the primary side controller circuit 30 is performing the PWM switching operation, the switch control circuit 62 controls the HV start-up switch SSU to be OFF. Note that when the primary side controller circuit 30 is determined as being performing the PWM switching operation, it indicates that the power (e.g. the supply voltage VDD) is ready. Hence, according to the present invention, when the supply voltage VDD is determined as being not ready according to the primary side related signal S1R, the HV start-up switch SSU can be controlled to be ON to conduct the HV signal VHV for providing the supply voltage VDD on the supply node NDD.

Figure 8D:
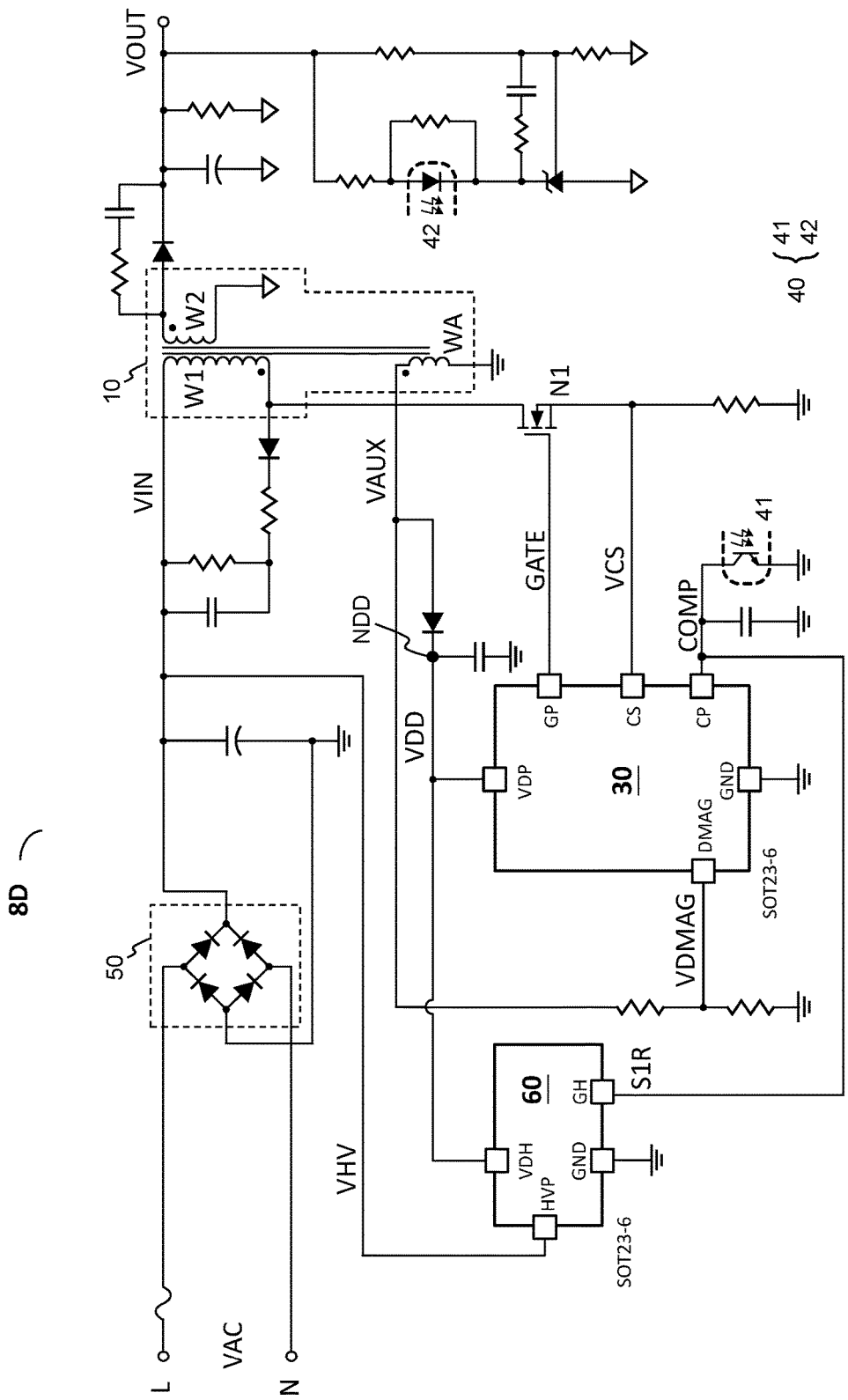
Figure 10:
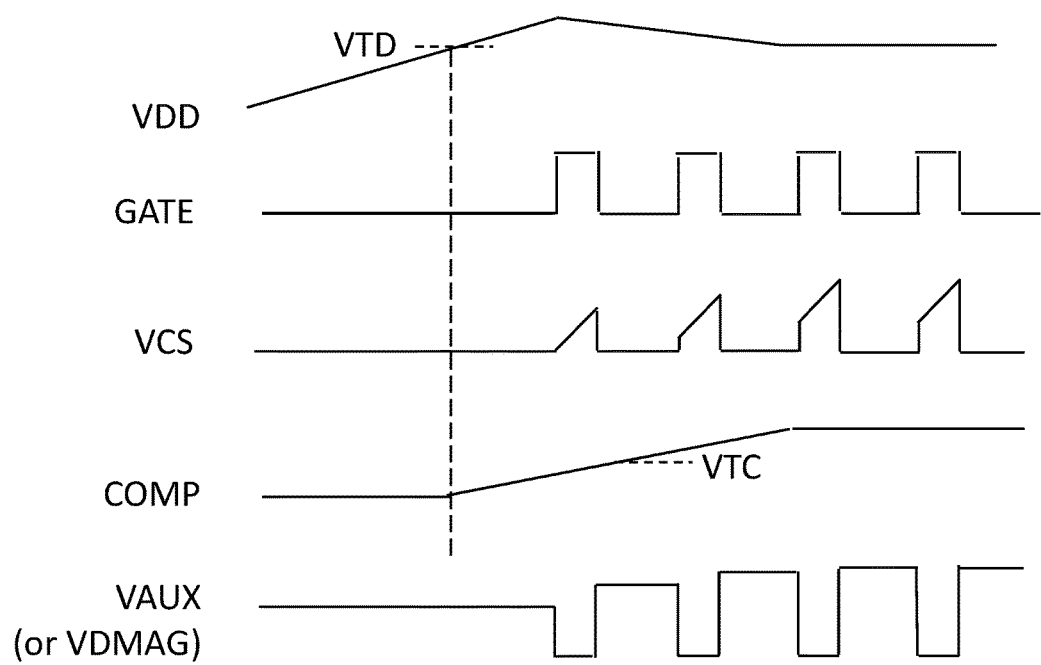
FIG. 10 shows a schematic diagram of waveforms corresponding to embodiments shown in FIGS. 8A-8D and 9A-9B according to the present invention.

Note that the primary side related signal S1R is not limited to the primary side switch control signal GATE as shown in FIG. 8A. In other embodiments, the primary side related signal S1R can instead be other signals related to PWM switching. Referring to FIGS. 8B-8D and 10, in other embodiments, the primary side related signal S1R can be a primary side current related signal VCS (FIG. 8B), or an auxiliary voltage related signal VDMAG (such as a voltage division of the auxiliary voltage VAUX in FIG. 8C). Since these signals also relate to the PWM switching operation, they can be sensed by the sensing pin GH to determine whether the primary side controller circuit 30 is performing the PWM switching operation (e.g. whether the supply voltage VDD is ready), and the HV start-up switch SSU can be controlled accordingly. Besides, the primary side related signal S1R is not limited to being related to signals containing direct PWM switching information. Still referring to FIG. 10, in one embodiment, the primary side related signal S1R can be a signal related to a feedback compensation signal COMP (as shown in FIG. 8D). Generally, the feedback compensation signal COMP starts sending the feedback control information after the supply voltage VDD is ready (for example when the supply voltage VDD exceeds VTD as shown in the figure). That is, when the primary controller circuit 30 can operate normally, the feedback compensation signal COMP is usually within a certain voltage range. Hence, the HV start-up circuit can determine whether the primary side controller circuit 30 is operating normally (i.e. whether the supply voltage is ready) by determining whether the feedback compensation signal COMP is within a predetermined voltage range through the sensing pin GH (for example but not limited to whether the feedback compensation signal COMP is larger than a predetermined compensation signal threshold VTC as shown in FIG. 10).

Figure 9B:
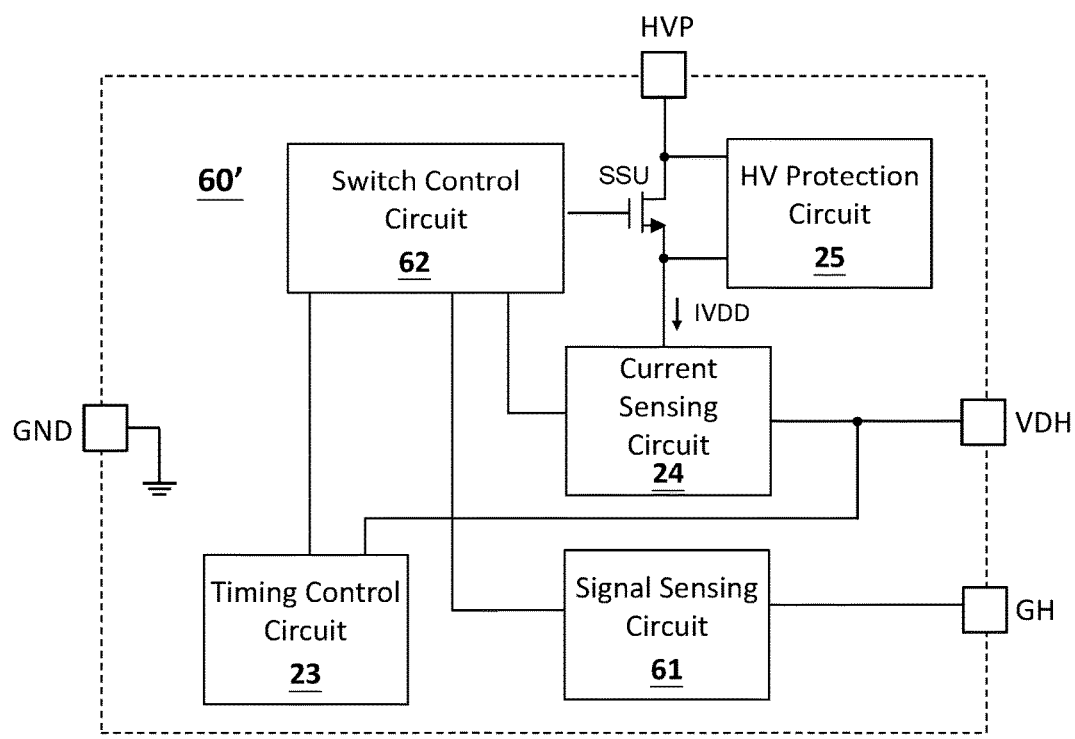
FIG. 9B shows a schematic diagram of one specific embodiment of a high voltage start-up circuit of the flyback power converter circuit according to the present invention.

FIG. 9B shows a schematic diagram of another specific embodiment of a high voltage start-up circuit of the flyback power converter circuit according to the present invention (HV start-up circuit 60'). In this embodiment, the HV start-up circuit 60' can further include the aforementioned timing control circuit 23, the current sensing circuit 24, and/or the HV protection circuit 25 as described earlier in other embodiments.

In one embodiment, the HV start-up circuit 60 or 60' can be packaged in for example but not limited to an SOT23-6 integrated circuit package.

As described hereinbefore, by two separately packaged integrated circuits (i.e. the HV start-up circuit 20 or 60, and the primary side controller circuit 30), the flyback power converter circuit of the present invention can achieve rapid power start-up with higher control flexibility by the separately provided HV start-up circuit. Besides, safety functions such as AC high voltage bleeding can also be achieved. Also note that, according to the present invention, since the HV start-up circuit can sense the supply voltage VDD or the primary side related signal S1R by itself, the primary side controller circuit does not require extra control pins or control functions for controlling the HV start-up switch, whereby the circuit board area and the cost can be reduced and the inventory control is simpler compared to the prior art of integrated type. Besides, the HV start-up circuit is highly compatible with the primary side controller circuit 30 due to the integration of the HV start-up switch SSU.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, the HV start-up switch SSU is not limited to the NMOS transistor as shown in the embodiments hereinbefore, and can be replaced by other types of switches such as PMOS, BJT or JFET. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A flyback power converter circuit, comprising:
a transformer, which includes a primary side winding for receiving an input voltage; a secondary side winding for generating an output voltage; and an auxiliary winding for generating an auxiliary voltage and providing a supply voltage on a supply node;
a primary side switch, coupled to the primary side winding and configured to control the primary side winding;
a primary side controller circuit, which is located at a primary side of the transformer and powered by the supply voltage through the supply node, and is configured to operably generate a primary side switch control signal to control the primary side switch; and
a high voltage (HV) start-up circuit, including a high voltage (HV) input pin and a supply output pin, wherein the HV input pin is coupled to a high voltage (HV) signal, and the HV start-up circuit provides the supply voltage on the supply node through the supply output pin; wherein the HV start-up circuit further includes:
  a high voltage (HV) start-up switch, wherein a current inflow terminal of the HV start-up switch is coupled to the HV input pin, and a current outflow terminal of the HV start-up switch is coupled to the supply output pin;
  a switch control circuit, configured to operably control the HV start-up switch according to a sensing output signal; and
  a signal sensing circuit, configured to operably generate the sensing output signal to control the HV start-up switch by one of the following ways:
    (1) the signal sensing circuit being configured to sense the supply voltage, wherein when the supply voltage does not exceed a start-up voltage threshold, the switch control circuit controls the HV start-up switch to be ON to conduct the HV signal for providing the supply voltage on the supply node, and when the supply voltage exceeds the start-up voltage threshold, the HV control circuit controls the HV start-up switch to be OFF;
    (2) the signal sensing circuit being configured to sense a primary side related signal to determine whether the primary side controller circuit is performing a PWM switching operation, wherein when the primary side controller circuit is not performing the PWM switching operation, the switch control circuit controls the HV start-up switch to be ON to conduct the HV signal for providing the supply voltage on the supply node, and when the primary side controller circuit is performing the PWM switching operation, the switch control circuit controls the HV start-up switch to be OFF;
  wherein the primary side related signal relates to the primary side switch control signal, a primary side current related signal which relates to a primary side current that flows through the primary side winding, an auxiliary voltage related signal which relates to a voltage of the auxiliary winding, or a feedback compensation signal;
  wherein the HV start-up circuit and the primary side controller circuit are separately packaged into a first integrated circuit and a second integrated circuit respectively.

2. The flyback power converter circuit as claim 1, wherein the HV start-up circuit further includes a timing control circuit which is configured to operably perform one of the following operations: (1) determining whether the primary side controller circuit operates in a latch mode or in a hiccup mode according to a change rate of the supply voltage VDD versus time; or (2) controlling the HV start-up switch to conduct for a predetermined time period.

3. The flyback power converter circuit as claim 1, wherein the HV start-up circuit further includes a current sensing circuit which is configured to operably sense a conduction current of the HV start-up switch, wherein the switch control circuit determines whether the primary side controller circuit operates in a latch mode or in a hiccup mode according to the conduction current of the HV start-up switch.

4. The flyback power converter circuit as claim 1, wherein the HV start-up circuit further includes a HV protection circuit which is configured to operably sense the HV signal, wherein when the HV signal keeps in a non-sinusoidal form for over a predetermined time period, the HV protection circuit bleeds the HV signal.

5. The flyback power converter circuit as claim 1, wherein the HV signal is electrically connected to the input voltage directly.

6. The flyback power converter circuit as claim 1, further comprising a rectifier circuit which is configured to operably rectify an AC input signal to generate a rectified output signal, wherein the HV signal is electrically connected to the rectified output signal.

7. The flyback power converter circuit as claim 1, wherein the HV start-up circuit further includes a sensing pin which is configured to operably sense the primary side related signal.

8. A high voltage (HV) start-up circuit for use in a flyback power converter circuit, the flyback power converter circuit including: a transformer, which includes a primary side winding for receiving an input voltage; a secondary side winding for generating an output voltage; and an auxiliary winding for generating an auxiliary voltage and providing a supply voltage on a supply node; a primary side switch, coupled to and configured to control the primary side winding; and a primary side controller circuit, which is located at a primary side of the transformer and powered by the supply voltage through the supply node, and is configured to operably generate a primary side switch control signal to control the primary side switch; the HV start-up circuit comprising:
- a high voltage (HV) input pin which is coupled to a high voltage (HV) signal;
- a supply output pin, wherein the HV start-up circuit provides the supply voltage on the supply node through the supply output pin;
- a high voltage (HV) start-up switch, wherein a current inflow terminal of the HV start-up switch is coupled to the HV input pin, and a current outflow terminal of the HV start-up switch is coupled to the supply output pin;
- a switch control circuit, configured to operably control the HV start-up switch according to a sensing output signal; and
- a signal sensing circuit, configured to operably generate the sensing output signal to control the HV start-up switch by one of the following ways:
  - (1) the signal sensing circuit being configured to sense the supply voltage, wherein when the supply voltage does not exceed a start-up voltage threshold, the switch control circuit controls the HV start-up switch to be ON to conduct the HV signal for providing the supply voltage on the supply node, and when the supply voltage exceeds the start-up voltage threshold, the HV control circuit controls the HV start-up switch to be OFF;
  - (2) the signal sensing circuit being configured to sense a primary side related signal to determine whether the primary side controller circuit is performing a PWM switching operation, wherein when the primary side controller circuit is not performing the PWM switching operation, the switch control circuit controls the HV start-up switch to be ON to conduct the HV signal for providing the supply voltage on the supply node, and when the primary side controller circuit is performing the PWM switching operation, the switch control circuit controls the HV start-up switch to be OFF;
- wherein the primary side related signal relates to the primary side switch control signal, a primary side current related signal which relates to a primary side current that flows through the primary side winding, an auxiliary voltage related signal which relates to a voltage of the auxiliary winding, or a feedback compensation signal;
- wherein the HV start-up circuit and the primary side controller circuit are separately packaged in a first integrated circuit and a second integrated circuit respectively.

9. The HV start-up circuit as claim 8, further comprising a timing control circuit which is configured to operably perform one of the following operations: (1) determining whether the primary side controller circuit operates in a latch mode or in a hiccup mode according to a change rate of the supply voltage VDD versus time; or (2) controlling the HV start-up switch to conduct for a predetermined time period.

10. The HV start-up circuit as claim 8, further comprising a current sensing circuit which is configured to operably sense a conduction current of the HV start-up switch, wherein the switch control circuit determines whether the primary side controller circuit operates in a latch mode or in a hiccup mode according to the conduction current of the HV start-up switch.

11. The HV start-up circuit as claim 8, further comprising a HV protection circuit which is configured to operably sense the HV signal, wherein when the HV signal keeps in a non-sinusoidal form for over a predetermined time period, the HV protection circuit bleeds the HV signal.

12. The HV start-up circuit as claim 8, wherein the HV signal is electrically connected to the input voltage directly.

13. The HV start-up circuit as claim 8, wherein the flyback power converter circuit further includes a rectifier circuit which is configured to operably rectify an AC input signal to generate a rectified output signal, wherein the HV signal is electrically connected to the rectified output signal.

14. The HV start-up circuit as claim 8, further comprising a sensing pin which is configured to operably sense the primary side related signal.

\* \* \* \* \*